May 31, 1927.  1,630,967
A. POWELSKI
JOURNAL BEARING
Filed July 18, 1924    5 Sheets-Sheet 4
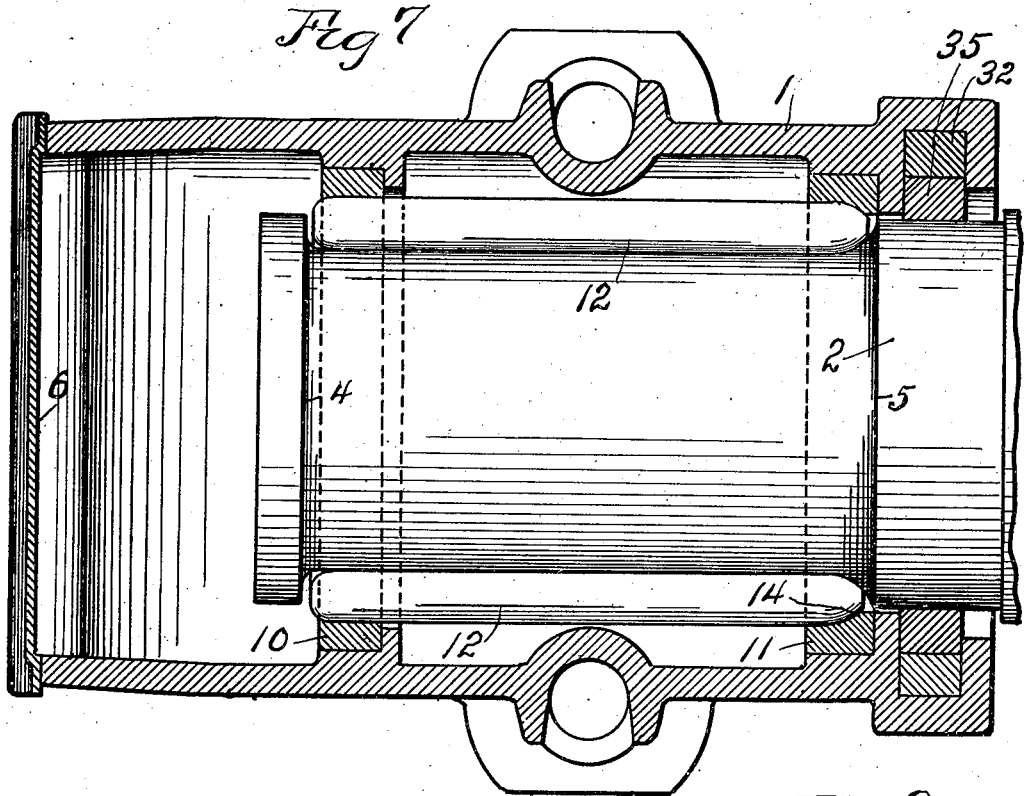
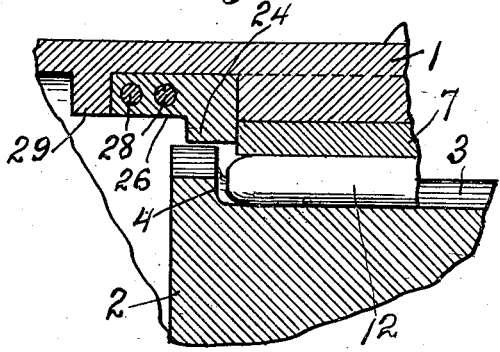
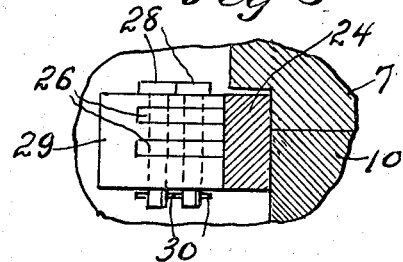
INVENTOR.
Albert Powelski
BY Warren D. House
His ATTORNEY.
Witness:
R. E. Hamilton May 31, 1927. 1,630,967
A. POWELSKI
JOURNAL BEARING
Filed July 18, 1924   5 Sheets-Sheet 5
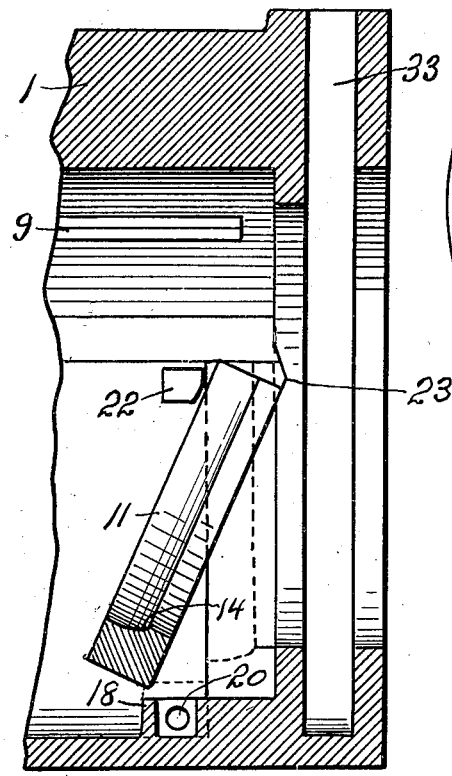
Fig 10
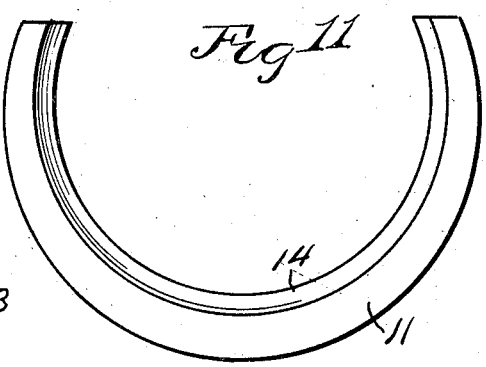
Fig 11
Fig 12
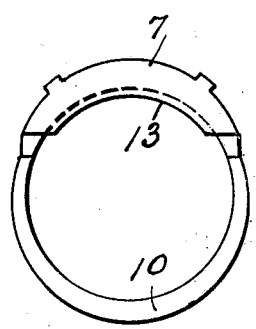
Fig 13
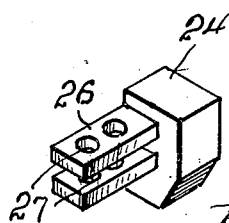
Fig 14
INVENTOR.
Albert Powelski
BY Warren D. House
His ATTORNEY.
Witness:
R. E. Hamilton Patented May 31, 1927.

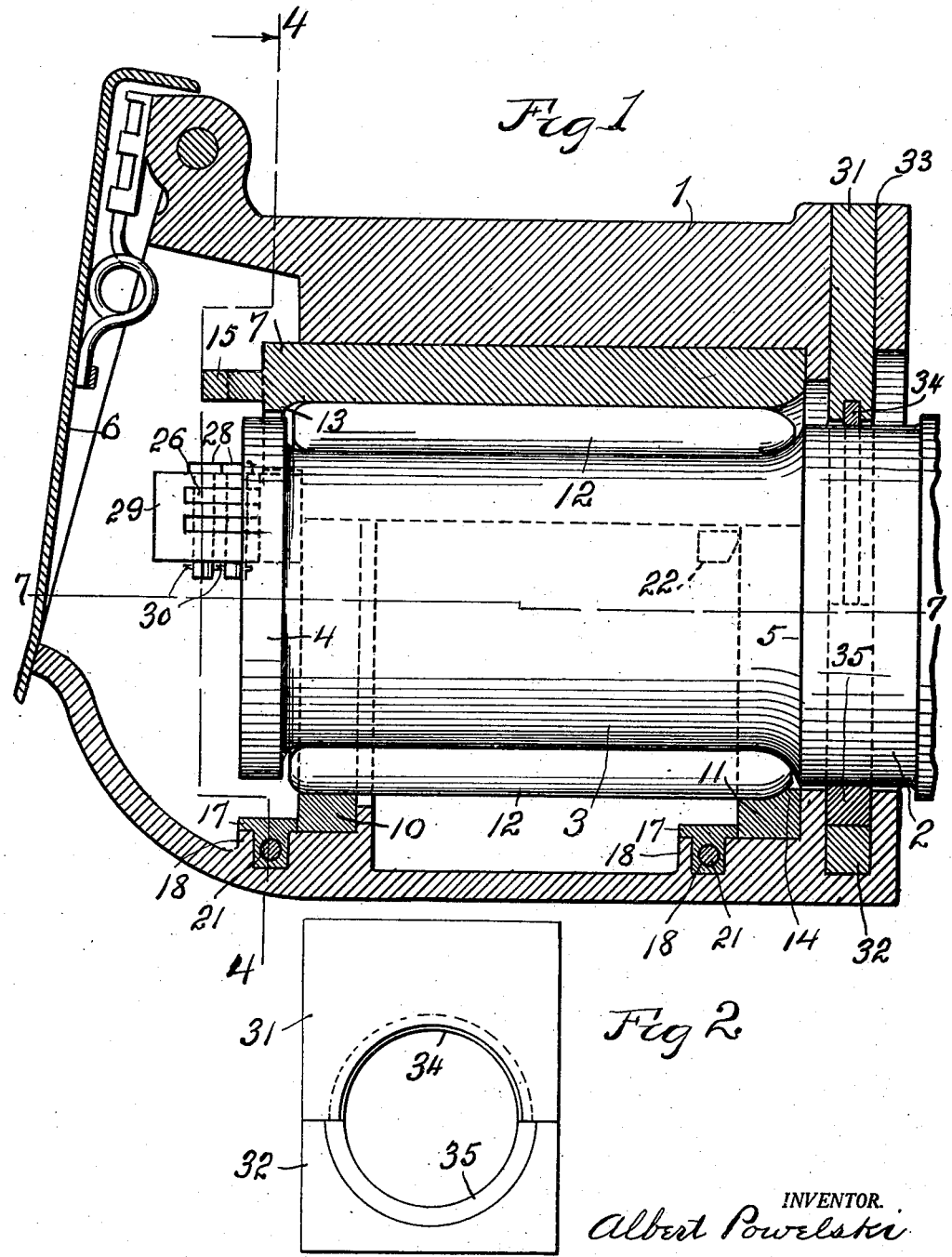

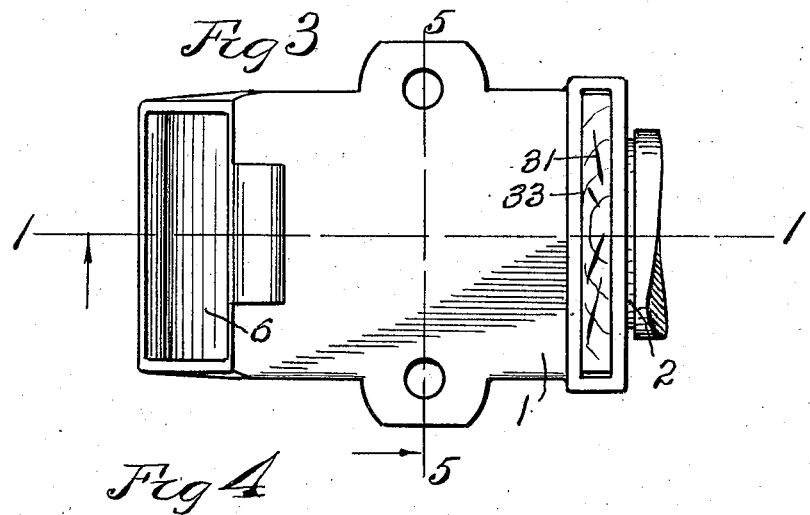
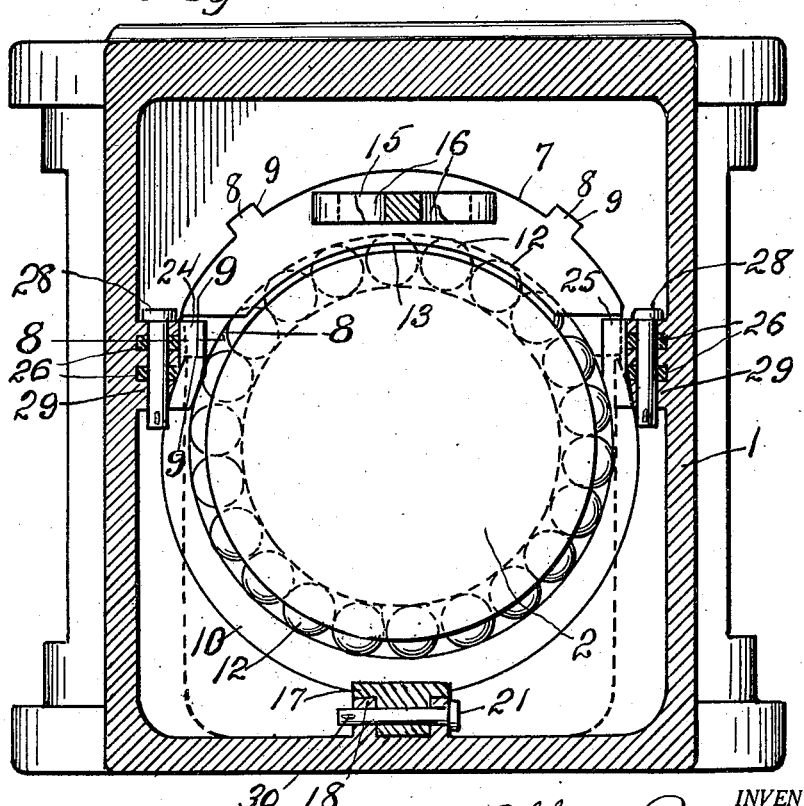

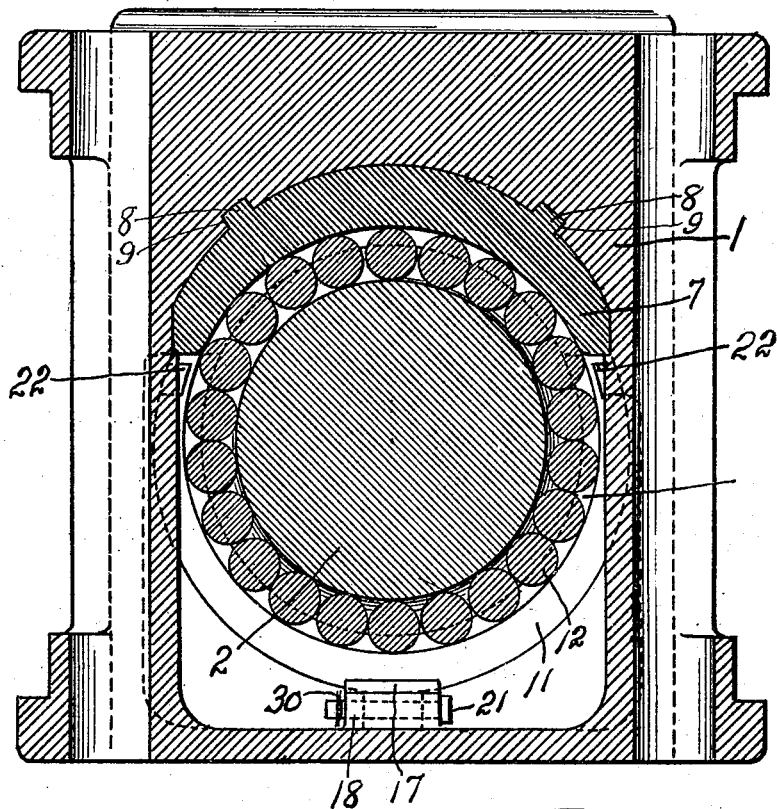
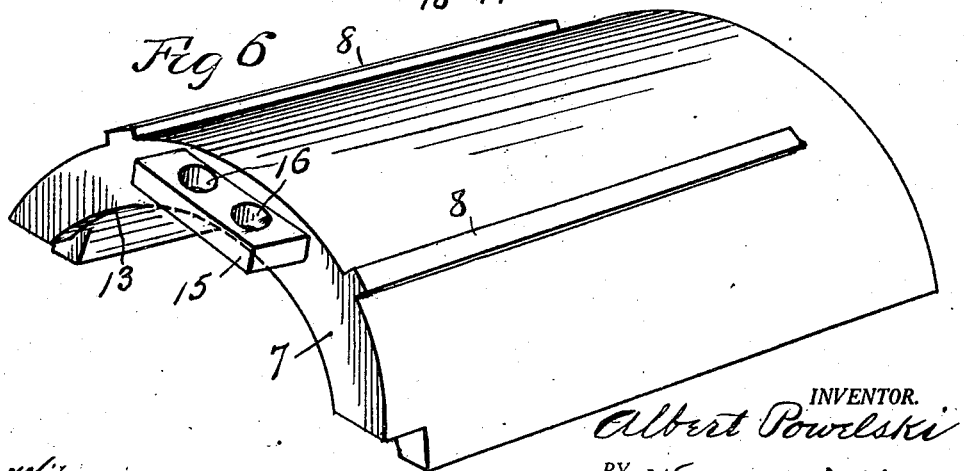

1,630,967

UNITED STATES PATENT OFFICE.

ALBERT POWELSKI, OF KANSAS CITY, KANSAS.

JOURNAL BEARING.

Application filed July 18, 1924. Serial No. 726,745.

My invention relates to improvements in journal bearings.

It relates particularly to railroad car journal boxes having roller bearings.

One of the objects of my invention is to provide a journal bearing of the kind described, which is simple, cheap, strong, durable, not liable to get out of order, in which the parts may be readily removed or inserted, which is adapted for the usual type of journal box, and which is applicable to the ordinary journal without any alterations thereto.

A further object of my invention is the provision of independently insertible and removable bearing members adapted to co-operate with rollers.

Still another object of my invention is to provide novel means for releasably holding bearing members in their operative positions in the journal box.

My invention provides still further a novel bearing member adapted for co-operation with rollers and having novel means for holding the rollers from longitudinal movement beyond a pre-determined point relatively to the bearing member.

Still another object of my invention is the provision of a novel dust guard, which also serves to prevent lubricating material in the box from escaping therefrom along the journal.

The novel features of my invention are hereinafter fully described and claimed.

In the accompanying drawings, which illustrate the preferred embodiment of my invention, Fig. 1 is a vertical sectional view, enlarged, on the line 1—1 of Fig. 3, of my improved journal bearing.

Fig. 2 is a reduced elevation of my improved dust guard.

Fig. 3 is a reduced plan view of my improved journal bearing.

Fig. 4 is a cross section on the line 4—4 of Fig. 1.

Fig. 5 is a cross section, enlarged, on the line 5—5 of Fig. 3.

Fig. 6 is a perspective view of the upper bearing member.

Fig. 7 is a horizontal section on the line 7—7 of Fig. 1.

Fig. 8 is a sectional view on the line 8—8 of Fig. 4.

Fig. 9 is a sectional view on the line 9—9 of Fig. 4.

Fig. 10 is a central vertical sectional view of a portion of the journal box, and the rear lower bearing member, shown in dotted lines in its operative position and in solid lines in the position occupied by it when it is being removed or inserted.

Fig. 11 is a front elevation of the rear lower bearing member.

Fig. 12 is a perspective view of one of the locking members.

Fig. 13 is a front elevation, reduced, of the upper bearing member and the front lower bearing member.

Fig. 14 is a perspective view of one of the side locking members.

Similar reference characters designate similar parts in the different views.

1 designates the axle box, which in its general construction, corresponds to a box which is in common use.

2 designates an ordinary car axle journal having the usual peripheral annular groove 3, and the usual annular peripheral abutments 4 and 5, at the ends respectively of the groove 3. The open front side of the box 1 is provided with the usual lid 6.

Longitudinally slidable into and out of the box 1 is an upper bearing member 7, which at its rear side, in its operative position, bears against the box 1. The member 7 is disposed above the groove 3 and is spaced apart from the journal. To hold the member 7 from any turning movement, suitable means may be provided, such as longitudinal tongues 8 respectively fitted in longitudinal grooves 9 in the box 1, Figs. 4 and 5.

Below the upper bearing member 7 is a front lower bearing member 10 and at the rear thereof a lower rear bearing member 11, Fig. 1. The inner sides of the members 10 and 11 bear against the box 1. The inner peripheries of the members 7, 10 and 11 are arcuate and form with the grooved portion of the journal 2 and with each other an annular ball race in which are located longitudinal rollers 12, disposed between the abutments 4 and 5, and which are adapted for traveling contact with the journal 2 and with the members 7, 10 and 11.

The front portion of the member 7 has an inner arcuate ledge 13, Fig. 1, which is adapted to engage the front ends of the rollers 12 to limit their forward movement with respect to the member 7. The inner periphery of the member 11 is provided with a similar ledge 14 adapted to engage the other ends of the rollers 12. The front side of the member 7 has a lug 15, provided with one or more vertical holes 16, which may be engaged by a suitable instrument, not shown, for sliding the member 7 toward and from its operative position.

For releasably holding the lower portions of the members 10 and 11 from forward movement, suitable releasable locking means may be provided. For this purpose, there may be provided two T-shaped locking members 17, which are alike in construction, one being shown in Fig. 12. The locking members 17 are respectively mounted in vertical holes provided in two lugs 18 on the inside of the bottom of the box 1. Each member 17 is provided with a transverse hole 19, which is adapted to register with a transverse hole 20, with which each lug 18 is provided. Two pins 21 are removably mounted in the holes 19 and in the lugs 18 for releasably holding the members 17 in their locking position, in which the heads of the locking members 17 respectively bear against the front sides of the members 10 and 11. For holding the upper portion of the rear member 11 in its operative position, the inner side of the box 1 is provided at opposite sides respectively with two lugs 22, which extend across the front side of the member 11. When the latter is inserted in the box, it is tilted upwardly and rearwardly, as shown in solid lines in Fig. 10, and in this position is passed behind the lugs 22 and then upwardly and rearwardly, so as to assume the position shown in dotted lines in Fig. 10. To permit of this movement, the inner side of the rear of the box may be recessed at 23, Fig. 10.

For holding the upper portion of the front member 10 in position, and for also holding the upper member 7 in its operative position, suitable means may be provided, such as two locking members 24 and 25, each of which has one or more forwardly extending arms 26, which are provided with vertical holes 27, in which are removably mounted vertical pins 28, which extend respectively through vertical holes provided in two lugs 29, which are respectively disposed on opposite inner sides of the box 1. The lugs 29 are each provided with recesses adapted to respectively receive the adjacent arms 26. Wires 30 may be extended through holes provided therefor in the pins 21 and 28 to hold the latter from detachment.

My improved dust guard comprises an upper member 31, Fig. 2, and a lower member 32, which are slidably fitted in the usual grooved portion 33, in the rear portion of the box 1. The lower edge of the member 31 has an arcuate recess in which is fitted an arcuate lining 34, preferably of yielding material, such as felt. The upper side of the member 32 has an arcuate portion in which is fitted a similar lining 35, which is also fitted in the lower portion of the groove 33. The lining 34 and 35 bears on the periphery of the journal 2 and prevents lubricant from being splashed out of the rear end of the box along the journal.

In assembling the bearing, the dust guard members 31 and 32 are slipped into the groove 33. The member 11 is then inserted, as shown in Fig. 10, to the position shown in dotted lines in said figure, following which the rear locking member 17 is inserted in the rear lug 18, and is locked in position by the insertion of the rear pin 21, a wire 30 being passed through the pin to hold it in position.

The journal 2 is then passed through the dust guard and member 11. The member 10 is then mounted in operative position, Figs. 1 and 4, after which the locking member 17 is placed in the front lug 18 against the front side of the member 10. The front pin 21 is then passed through the adjacent member 17 and front lug 18, and a wire 30 passed through the pin.

The rollers 12 are then placed one by one between the journal and the members 10 and 11. When the rollers have all been placed, the member 7 is slid rearwardly into its operative position, Figs. 1, 4 and 5, after which the locking members 24 and 25 are respectively interlocked with the lugs 29. The pins 28 are then extended through the lugs 29 and the adjacent locking members 24 and 25 respectively. Wires 30 are then passed through the pins 28. The bearing members 7, 10 and 11 will now be locked securely in their operative positions.

When the member 7 requires to be removed, for any purpose, the operation just described is reversed.

The arcuate ledges 13 and 14 being adapted to respectively engage opposite ends of the rollers 12, the latter are limited as to longitudinal movement relatively to the bearing members 7, 10 and 11.

I do not limit my invention to the structure shown and described, as many modifications, within the scope of the appended claims may be made without departing from the spirit of my invention.

What I claim is:—

1. In a journal bearing, a journal box adapted to receive a journal and provided with fastening lugs, upper and lower bearing members in said box having respectively arcuate inner surfaces adapted to form with said journal an annular race and bearing at their rear sides against said box, removable locking members bearing respectively against the front sides of said members for holding the latter in operative position and respectively engaging said lugs, releasable means for locking said locking members to said lugs respectively, and rollers adapted for travel in said race in contact with said bearing members and said journal.

2. In a journal bearing, a journal box adapted to receive a journal, an upper bearing member, two lower bearing members one in front of the other, each of said members bearing at its inner side against said box, said members having arcuate inner surfaces adapted to form with said journal an annular race, releasable means for locking said members in operative position in said box, and rollers adapted for travel in said race in contact with said journal and said bearing members.

3. In a journal bearing, a journal box adapted to receive a journal and having two lugs on its opposite inner sides respectively, an upper bearing member and a lower bearing member in said box and bearing against said box at their rear sides and adapted to form with the journal an annular race, releasable means engaging said lugs and bearing against the front sides of said members for holding the latter in operative position, and rollers adapted for travel in said race in contact with said members and said journal.

4. In a journal bearing, a journal box adapted to receive a journal and having on its opposite inner sides respectively two lugs, an upper bearing member and a lower bearing member in said box and bearing at their rear sides against said box and adapted to form with said journal an annular race, two removable locking members respectively engaging said lugs and bearing against the front sides of said members, releasable means for respectively fastening said locking members to said lugs, and rollers adapted for travel in said race in contact with said bearing members and said journal.

5. In a journal bearing, a journal box adapted to receive a journal and having on its inner sides fastening lugs, upper and lower bearing members in said box bearing at their rear sides against said box and adapted to form with said journal an annular race, removable locking members respectively releasably engaging said lugs and bearing respectively against the front sides of said bearing members, removable devices respectively holding said locking members and said lugs in locked engagement, and rollers adapted for travel in said race in contact with said journal and said bearing members.

6. In a journal bearing, a journal box adapted to receive a journal and having on its inner sides lugs, upper and lower bearing members in said box and bearing at their rear sides against said box and adapted to form with said journal an annular race, locking members respectively engaging the front sides of said bearing members and having releasable interlocked engagement with said lugs respectively, removable pins respectively mounted in said lugs and extending respectively into said locking members for holding the latter engaged with said lugs, and rollers adapted for travel in said race in contact with said journal and said bearing members.

In testimony whereof I have signed my name to this specification.

ALBERT POWELSKI.